United States Patent [19]

Connor

[11] 4,255,995
[45] Mar. 17, 1981

[54] DUST CONFINING AND COLLECTION HOUSING FOR POWER TABLE SAWS AND THE LIKE

[76] Inventor: J. Franklin Connor, 228 Windsor Ave., Upper Darby, Pa. 19082

[21] Appl. No.: 115,029

[22] Filed: Jan. 24, 1980

[51] Int. Cl.³ .................... B27G 3/00; B23D 45/06
[52] U.S. Cl. ................................. 83/100; 83/477.2; 51/273; 144/252 R
[58] Field of Search ............... 83/100, 477.2; 144/252 R; 51/273, 268

[56] References Cited

U.S. PATENT DOCUMENTS

| Re. 15,262 | 1/1922 | Gurgel | 83/100 |
|---|---|---|---|
| 922,840 | 5/1909 | Bemiller | 83/100 |
| 1,014,872 | 1/1912 | Gray et al. | 83/100 |
| 1,789,569 | 1/1931 | Tannewitz . | |
| 2,044,481 | 6/1936 | Manley et al. | 144/252 |
| 3,007,501 | 11/1961 | Mundell et al. | 144/252 |
| 3,119,602 | 1/1964 | Johnson | 51/273. X |
| 4,005,625 | 2/1977 | Brochu et al. | 83/100 |
| 4,022,182 | 5/1977 | Lenkevich | 51/273 |
| 4,063,478 | 12/1977 | Stuy | 83/100 |

*Primary Examiner*—Donald R. Schran
*Attorney, Agent, or Firm*—Frailey & Ratner

[57] ABSTRACT

A dust-tight housing for confining, collecting and removing sawdust created by a power table saw, whereof the circular saw blade is affixed to a rotatable shaft located below the work table. The saw blade has its upper portion protruding through a slot in the table. Its lower portion is enclosed in dust-tight relation within the housing. The housing is mounted to the understructure of the power table saw so that it is moveable angularly in harmony with the angular movements of the saw blade. The housing remains stationary during vertical movements of the saw blade. The side walls of the housing are provided with moveable elements which permit dust-tight passage of the saw blade shaft into the housing, and which provide for ease of access for removal and replacement of the saw blade. The moveable elements are automatically adjustable, upon vertical or angular movement or displacement of the saw blade, to maintain the dust-tight character of the housing at all times. The moveable elements accommodate the shaft at any selected location of the saw blade while providing a dust-tight closure about the shaft and the opening through which the shaft extends into the housing. The housing is adaptable for use with other power table tools, such as dados, sanders, grinders, shapers, etc.

19 Claims, 18 Drawing Figures

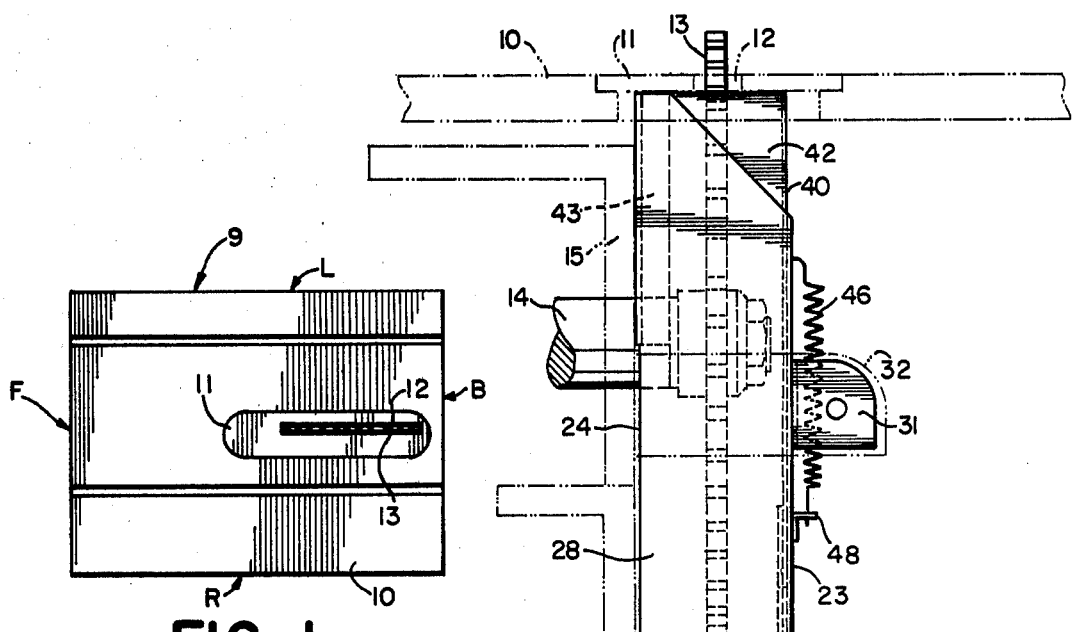
FIG. 1
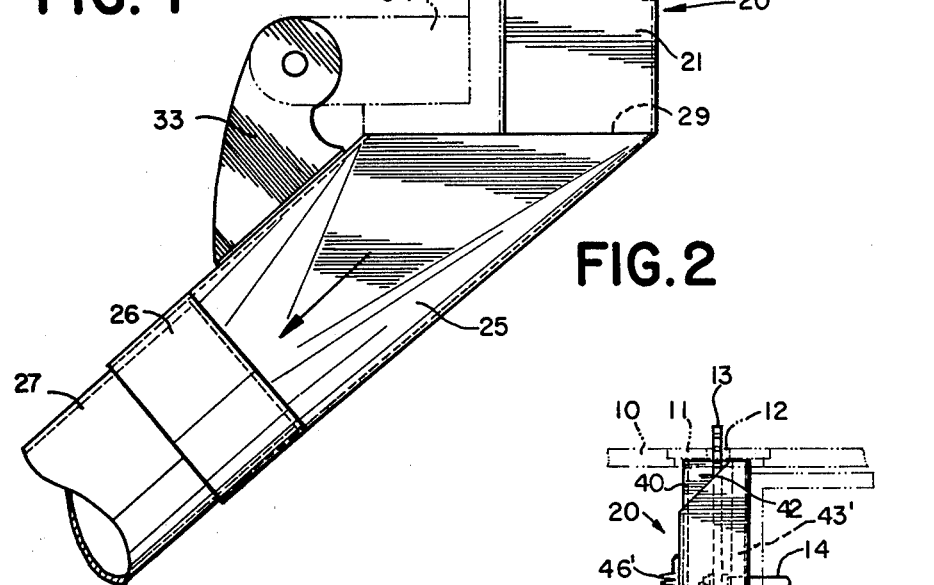
FIG. 2
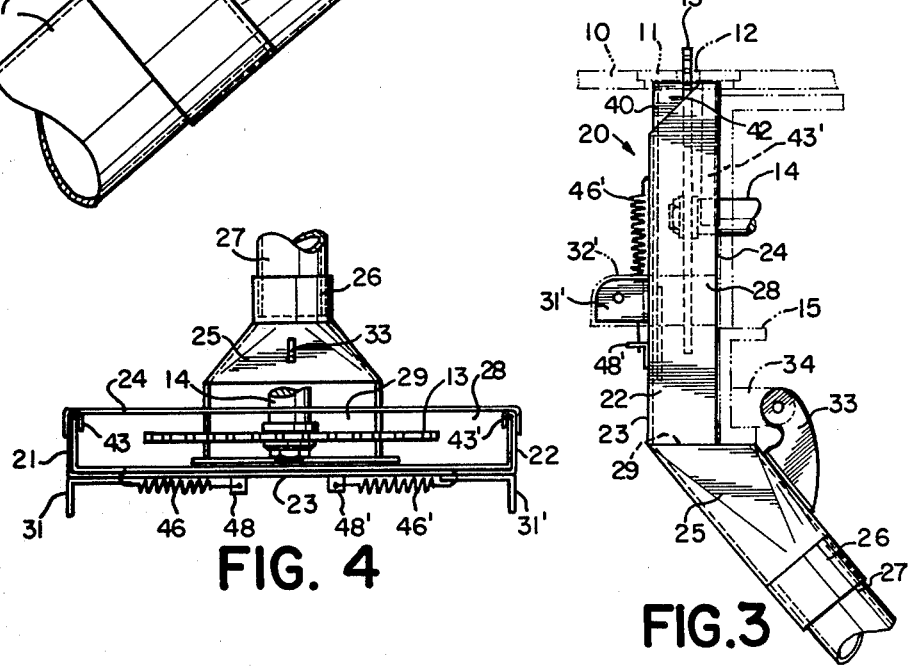
FIG. 4
FIG. 3

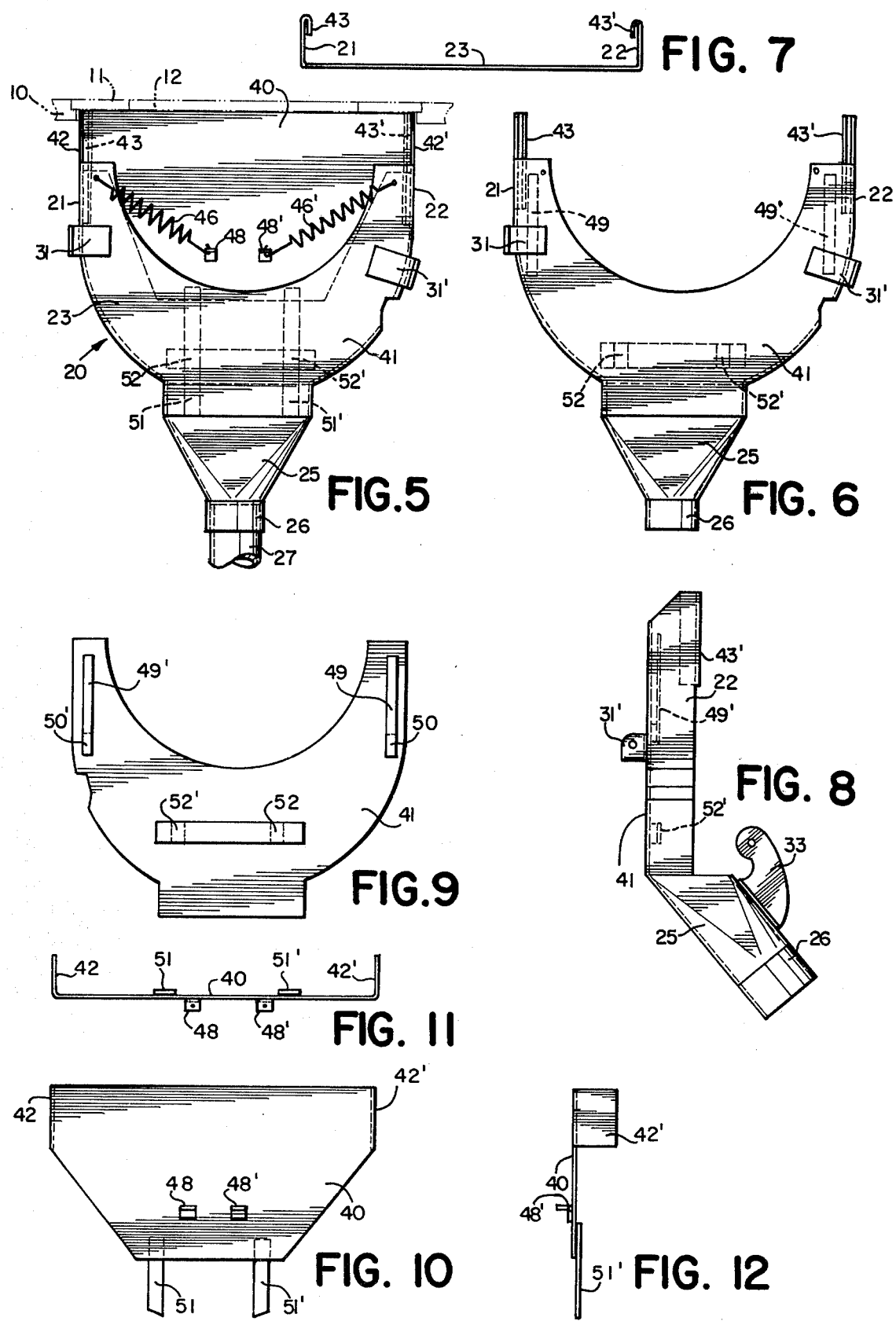

DUST CONFINING AND COLLECTION HOUSING FOR POWER TABLE SAWS AND THE LIKE

BACKGROUND OF THE INVENTION

This invention relates primarily to power table saws having a rotatable saw blade, although it is applicable to similar power table tools such as dados, sanders, grinders, shapers, and other such cutting tools where sawdust, chips and dust are created during operation of the tool. The power table saw or other power table tool to which the invention is applicable is mounted below a work table, with a portion of the cutting tool protruding upwardly through a slot or other opening formed in the table. A housing or similar enclosure surrounds the portion of the cutting tool or blade below the table to confine and remove the sawdust, chips or other particles generated by the operation of the tool. Suitable suction or other means may be connected to the interior of the housing for removal therefrom of the sawdust, chips or other particles.

Dust confining and collecting housings or enclosures for power table saws and similar cutting tools are known. Examples may be found in the following U.S. Pat. Nos. 922,840, 1,789,569, 2,044,481, 3,007,501 and 4,063,478.

Heretofore, dust confining and collection housings for power table saws and the like have not been effective in preventing the escape of dust from within the confines of the housing to the ambient atmosphere. This particularly has been true of power tools which have capacity for vertical and/or angular movement relative to a work table. Such movements of the cutting blade or element of the power tool tend to create gaps or clearances between the housing and the table or other element to which the housing abuts, permitting escape of dust from the housing.

A need exists in the use of power table saws and similar tools for a dust confining and collection housing which surrounds the cutting element of such a tool in dust-tight relationship at all times, so as to be 100% efficient, or nearly so, in confining, collecting and removing dust created by the operation of such a tool, regardless of the vertical or angular disposition of the cutting blade.

SUMMARY OF THE INVENTION

The primary object of this invention is to provide a new and useful dust confining and collection housing for power table saws and the like which surrounds the cutting element of such a tool in dust-tight relationship, regardless of the vertical or angular movement of the cutting element relative to the adjacent work table.

A further object is to provide a dust confining and collection housing for a power table tool, such as a table saw, which includes spaced side walls provided with moveable elements automatically operative to maintain the side walls of the housing closed in dust-tight relationship at all times during the operation of the power tool, regardless of the vertical or angular disposition of its cutting element.

A further object is to provide a power table saw housing which surrounds the portion of the saw blade disposed below the housing with dust-tight clearance for the passage of the saw blade shaft into the housing, regardless of the selected elevational or angular location of the saw blade relative to the work table.

A further object is to provide such a housing having moveable elements disposed on its side walls automatically operable to maintain the side walls dust-tight irrespective of the vertical or angular position of the saw blade.

A further object of the invention is to provide a dust confining and collection housing surrounding the saw blade of a table power saw in which one side wall of the housing is provided with a moveable slide automatically operative to continuously maintain such side wall in dust-tight contiguous or abutting relation to the table, and in which the other side wall of the housing is provided with an enlarged opening for the passage of the saw blade shaft therethrough, and further includes a plurality of moveable shutters automatically operative to continuously maintain the opening closed in dust-tight relationship, irrespective of the vertical or angular displacement of the saw blade.

Other objects and advantages of this invention will be readily apparent from the following description of the preferred embodiment thereof, reference being had to the accompanying drawing for the purpose of illustration.

BRIEF DESCRIPTION OF THE DRAWING

The preferred embodiment of this invention is illustrated in the drawing, wherein FIG. 1 is a fragmentary, more or less schematic illustration in top plan of a power table saw of the type to which the invention is applicable.

FIG. 2 is a front end view in elevation of the preferred embodiment of a power saw housing embodying this invention.

FIG. 3 is a rear end view in elevation showing the housing on a reduced scale.

FIG. 4 is a view of the housing in top plan.

FIG. 5 is a view in elevation of the right side of the housing.

FIG. 6 is a fragmentary view of the right side of the housing with various parts omitted.

FIG. 7 is a fragmentary view in top plan of the portion of the housing illustrated in FIG. 6.

FIG. 8 is a fragmentary view in elevation of the rear end of the portion of the housing illustrated in FIG. 7.

FIG. 9 is a fragmentary view in elevation of the inside of the stationary portion of the right side wall of the housing.

FIG. 10 is a view in elevation of the outside of the vertical slide comprising the moveable portion of the right side wall of the housing.

FIG. 11 is a view of the slide in top plan.

FIG. 12 is a view of the slide in elevation.

DETAILED DESCRIPTION OF THE PREFERRED EMBODIMENT

Figure 13:
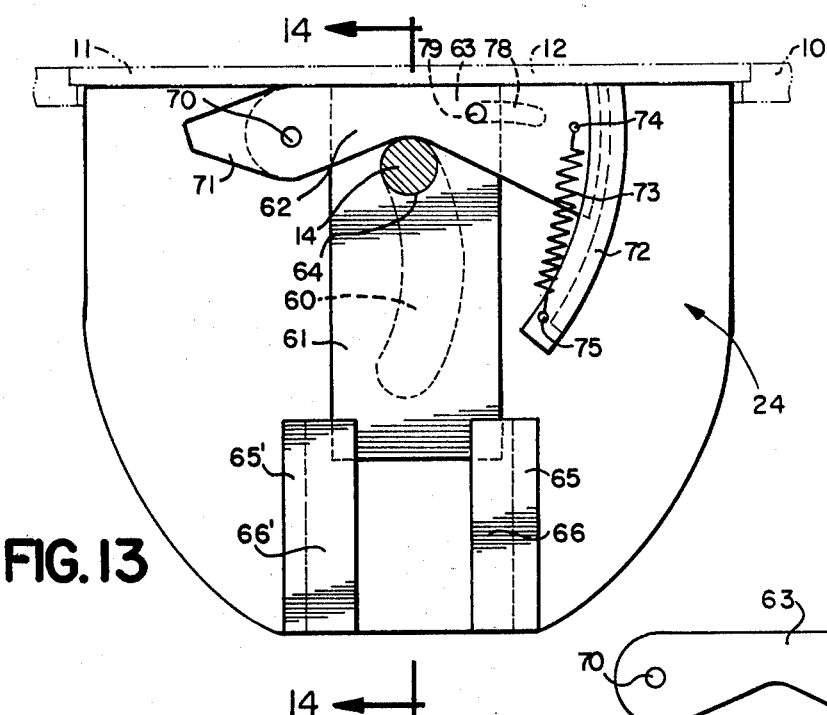
FIG. 13 is an enlarged view in elevation of the left side wall of the housing.
Figure 14:
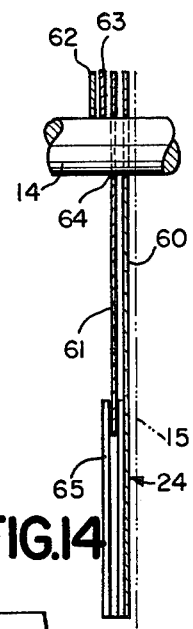
FIG. 14 is a sectional view looking in the direction of the angled arrows 14—14 of FIG. 13.
Figure 15:
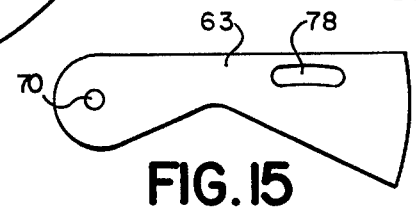
FIG. 15 illustrates one of the shutters mounted pivotally on the left side wall of the housing.

This invention is especially applicable to power table tools such as, for example, the Sears, Roebuck & Co. "Craftsman" model 113.299142 and 113.299040 rotatable 10 inch table saw. Such a power table saw is illustrated schematically at 9 in FIG. 1, and includes a horizontal work table 10 having the usual longitudinal slot 12 to provide clearance for a circular saw blade 13, or other work cutting element, protruding upwardly to work sawing or cutting position. The slot 12 may be formed in an insert 11 comprising part of the table 10. For convenience the table saw may be considered to have a front F, a rear B, a right side R and a left side L.

Referring to FIGS. 2-4 of the drawing, there is illustrated a conventional circular blade 13 for a table saw 9 rigidly affixed to a rotatable shaft 14 supported below table 10 by conventional bearing means (not shown) and driven by the usual drive motor (also not shown). The table saw 9 incorporates the usual mechanisms (not shown) enabling the saw blade 13 and its supporting shaft 14 to be raised and lowered vertically and to be tilted angularly relative to the table 10 for controlled cutting of the material to be sawed. The tilting mechanism for the saw blade 13 includes the usual tiltable, longitudinally extending casting or "cradle" 15 illustrated in phantom in FIGS. 2 and 3. As is well known, the tiltable cradle or support 15 is suitably connected to shaft 14 and is mounted pivotally on suitable bearing means. It is selectively moveable angularly relative to the table 10 by a conventional tilting lever (not shown). The power saw housing 20 is secured detachably to the tiltable cradle 15, and hence is moveable angularly therewith. Thus, the housing 20 is moveable angularly in harmony with and in fixed relation to saw blade 13.

The housing 20 comprises a hollow box-like enclosure of rectangular cross section located below the table 10 and surrounding the saw blade 13. The housing 20 is constituted by a front end wall 21, a rear end wall 22, a right side wall 23 and a left side wall 24. The side walls 23, 24 are disposed in spaced parallel relation to the saw blade 13 and to each other. The upper portions of the end walls 21, 22 are disposed in spaced parallel relation to each other and extend transversely of the saw blade 13. The upper edges of the four walls 21, 22 and 23, 24 are contiguous with the lower surface of the insert portion 11 of the table 10, and provide a dust-tight contact between the upper end of the housing 20 and the bottom of the table 10. The lower end of the housing 20 is connected to a downwardly inclined conduit or chute 25 which, in turn, is connected by a tubular coupling 26 to a flexible hose or tube 27 leading to any suitable suction source (not shown). The lower portions of the end walls 21, 22 preferably are inclined or curved inwardly to connect to the conduit 25. The end walls 21, 22 are relatively narrow whereas the side walls 23, 24 are relatively wide, to provide an enclosure having a cross section of relatively narrow width compared to its length. All of the walls 21, 22, 23, 24 are located in relative proximity to the saw blade 13.

The four walls 21, 22, 23, 24 of the housing 20 define a dust-tight hollow chamber 28 for the saw 13, such chamber being closed at its top by the abutting table 10, except for the clearance between slot 12 and saw blade 13. The lower end of chamber 28 is in communication with the interiors of the conduit 25 and hose 27 by means of an exit port 29 disposed between the lower end of housing 20 and the upper end of conduit 25. Thus, dust formed from the sawing operation of the circular saw blade 13 is confined and collected within the hollow area 28 enclosed by the housing 20 and is removed therefrom by the suction source aforesaid via exit port 29, conduit 25 and hose 27.

Affixed to the right side wall 23 of the housing 20 are a pair of horizontally spaced apertured ears 31, 31' by means of which the housing 20 is connected to horizontally spaced apertured brackets 32, 32' affixed to the tiltable cradle or support 15. The respective apertures of the housing ears 31, 31' and the cradle brackets 32, 32' are aligned axially for the reception of threaded bolts (not shown) or other suitable and conventional fasteners for detachably securing the housing 20 to the cradle 15. Similarly, an apertured ear 33, formed on the outer surface of the conduit 25, cooperates with an apertured bracket 34 affixed to the support cradle 15 to provide aligned apertures for the reception of a threaded bolt or other fastening means (not shown) for removably mounting the housing 20 on the tiltable support 15.

Referring now to FIGS. 7-12, it will be observed that the right side wall 23 of the housing 20 includes an upper slidable portion 40 and a lower stationary portion 41. The upper end of the slide 40 is provided with a pair of spaced, transverse or right-angled guides 42, 42' (FIG. 12) adapted to engage slidably within elongated grooves formed in each of a pair of spaced vertical channel-like guide tracks 43, 43' (FIGS. 6, 8) mounted on the spaced end walls 21, 22. A pair of spaced springs 46, 46' urge the slide 40 upwardly relative to the stationary portion 41 of wall 23, to maintain the upper edge of the slide 40 in contiguous or abutting relation to the lower surface of the table insert 11. Each spring 46, 46' may comprise a conventional coil spring having one end connected to a hook 48 and 48' secured to the lower portion of the slide 40 and its other end affixed to an upper location of the stationary wall portion 41, in the manner illustrated in FIG. 5.

To facilitate the sliding movement of slide 40 relative to wall portion 41, while maintaining a dust-tight contiguous relationship between those two relatively moveable parts, spaced leaf spring or spring clips 49, 49' affixed to the inside surface of the stationary wall portion 41 (FIG. 9) may be utilized. The lower ends of the leaf spring clips 49 are affixed to the wall portion 41 by soldering or any suitable securing means 50, 50'. The upper distal ends of the clips 49, 49' urge the slide 40 into contiguous relationship with the opposing inside surfaces of the stationary wall portion 41. Additionally, the slide 40 may be provided with a pair of spaced fingers or guides 51, 51' depending from its lower portion, and engageable slidably within spaced guide means 52, 52' mounted on the inside surface of the wall portion 41, to ensure a dust-tight sliding relationship between the parts 40, 41.

In the preferred embodiment, as illustrated in FIGS. 6-8, end walls 21, 22, the lower portion 41 of right side wall 23 and the conduit 25 are formed as a unitary, integral component of the housing 20. The slide 40, although a separate member, constitutes a moveable part of the right side wall 23. It is maintained at all times in dust-tight contiguous sliding relationship to the lower portion 41 of wall 23 by the various guide and retaining means 42, 43, 49, 51, 52 and 42', 43', 49', 51', 52' referred to above. Regardless of the angular disposition of the saw blade 13, the slide 40 remains in dust-tight contact with table 10. The springs 46, 46' permit the slide 40 to be raised and lowered automatically, relative to wall portion 41 and table 10, throughout the full angular range of saw blade 13. The structure of right side wall 23 ensures that, at all times there is abutting contact between the upper edge of the slide 40 and the bottom of the table 10 so that, during sawing operations, dust does not escape from the enclosure 20 between those parts, but is confined within the chamber 28 for discharge via conduits 25, 27.

The details of the structure of the left side wall 24 of the housing 20 are illustrated in FIGS. 13–18. As will be observed, its upper edge abuts table insert 11. Side wall 24 is provided with a centrally disposed enlarged opening 60 in the form of a generally vertical, elongated, arcuately shaped slot through which saw blade shaft 14 extends. The length of slot 60 permits shaft 14 to be raised or lowered relative to side wall 24. As indicated in FIGS. 2–4, shaft 14 terminates internally of the housing 20, and extends outwardly thereof, through slot 60, where it is supported below table 10 by the usual structure (not shown). The width of the arcuate slot 60 is slightly larger than the diameter of the shaft 14, to provide a close, dust-tight fit between the spaced sides of the slot and the peripheral surface of the shaft. It is essential, however, that the width of the slot 60 be sufficient to provide adequate clearance to enable the shaft 14 to move up and down with ease, relative to the slot 60 and housing 20, when the saw blade 13 is raised, lowered or tilted relative to the table 10.

To provide for the automatic, dust-tight closure of the open area or areas of the slot 60, irrespective of the location of the shaft 14 within the slot, there are mounted on the outside of the left housing wall 24 a slidable shutter 61 and a pair of superimposed pivotal shutters 62, 63. The slidable shutter 61 is provided with an aperture 64 through which saw blade shaft 14 extends. The diameter of the aperture 64 preferably is equal to the width of the arcuate slot 60, thereby providing a dust-tight close fit between the periphery of the shaft 14 and the perimeter of the aperture 64.

The slidable shutter 61 comprises a generally rectangular slide which is confined, with capacity for both limited longitudinal displacement and limited transverse displacement, by a pair of spaced vertical guide tracks 65, 65' affixed to side wall 24. The guide tracks 65, 65' are spaced apart a distance greater than the width of the slide 61, thereby providing the slide with capacity for limited transverse movement relative to the arcuate slot 60. Elongated flanges 66, 66' formed on the guide tracks 65, 65' prevent disengagement of the slide 61 from the guide tracks 65, 65' as the slide moves longitudinally and/or transversely relative to slot 60 and side wall 24.

The snug fit between shaft 14 and aperture 64 in slide 61 causes the slide to move vertically and/or horizontally in response to and in harmony with the vertical and/or angular movements of the saw blade shaft 14, whereby the slide functions as a closure for at least part of the open portion of the elongated slot 60. Thus, the engagement between shaft 14 and the perimeter of aperture 64 functions as a slot closure means for actuating the slot closure slide 61. Because of the close fit between the periphery of the shaft 14 and the aperture 64, finite movements of the shaft are transmitted by the perimeter of the aperture 64 to the slide 61 to actuate the slide to close varying portions of the open area of the slot 60, depending on the location of the shaft 14. As will be explained, slidable shutter 61 always maintains all of the open area of slot 60 below shaft 14 closed but, depending on the relative location of the shaft, may close all, or only a portion, of the open area of slot 60 above shaft 14.

The pivotal shutters 62, 63 function to close any portion of the open area of slot 60 above shaft 14 which is not closed by slide 61. The pivotal shutters 62, 63 have a common pivot point 70 about which those shutters are moveable arcuately or angularly relative to wall 24 and slot 60. The inner pivotal shutter 63 (FIG. 15) and the outer pivotal shutter 62 are of identical shape or configuration, except the latter shutter is provided with a rearwardly extending tail 71 which, as will be explained, functions as a stop to limit the downward arcuate movement of shutter 62. The upper edges of the pivotal shutters 62, 63 preferably are rectilinear, and function as stops, as will be explained, to limit the upper arcuate movements of those shutters. The distal ends of the pivotal shutters 62, 63 are curved, and are confined during their angular movements within an arcuate guide track 72 affixed to the side wall 24.

The outer pivotal shutter 62 is urged angularly downward relative to pivot point 70 by a spring 73, the upper end of which is affixed to a pin 74 mounted on shutter 62 and the lower end of which is affixed to a pin 75 secured to the side wall 24. The spring 73 may be a conventional coil spring, and constitutes slot closure means for the pivotal shutter 62. As shaft 14 is lowered, the shutter 62 is caused to pivot downward by spring 73 until tail 71 strikes the table insert 11, thereby preventing further downward movement of shutter 62. When shaft 14 is disposed in the upper portion of slot 60, spring 73 urges the outer pivotal shutter 62 into contact with the shaft. However, movement of the shaft 14 downward beyond the point where stop 71 prevents further downward movement of shutter 62 causes the shaft to lose contact with that shutter. As shaft 14 is moved upward relative to slot 60, beyond the lowermost angular position of pivotal shutter 62 as determined by stop 71, the shaft causes shutter 62 to pivot upwardly, about pivot point 70 and against the restraining force of spring 73. Such upward angular movement of shutter 62 continues until its top rectilinear edge, functioning as a stop, engages the underside of the table insert 11, thereby preventing further upward movement of the shutter.

Since stop 71 limits the downward angular displacement of shutter 62, the outer pivotal shutter 62 functions as a closure for the uppermost portion only of the slot 60. The function of the inner pivotal shutter 63 is to ensure that any intermediate open portion of the slot 60, above shaft 14, is closed when the shaft 14 is disposed in the lower portion of the slot.

The pivotal shutter 63, adjacent its distal end, is provided with an arcuate slot 78 which engages an upstanding pin 79 mounted on the upper portion of the slidable shutter 61. By reason of the engagement of the pin 79 within the slot 78, a connection is provided between slide 61 and shutter 63, whereby movement of the slide is transmitted to shutter 63 to cause it to move arcuately relative to the slot 60. As shaft 14 ascends relative to slot 60, to move slide 61 upwardly, the pin and slot connection 78, 79 between slide 61 and pivotal shutter 63 causes the latter to move upward angularly relative to the pivot 70. The upward movement of shutter 63 is arrested when its upper edge, acting as a stop, engages the underside of the table insert 11. When slide 61 is caused to move downward, upon the descent of shaft 14 relative to slot 60, the pin and slot connection 78, 79, functioning as a slot closure means for the pivotal shutter 63, causes that shutter to move downward to close off a portion of the open area of the slot 60 immediately above the shaft 14.

Figure 16:
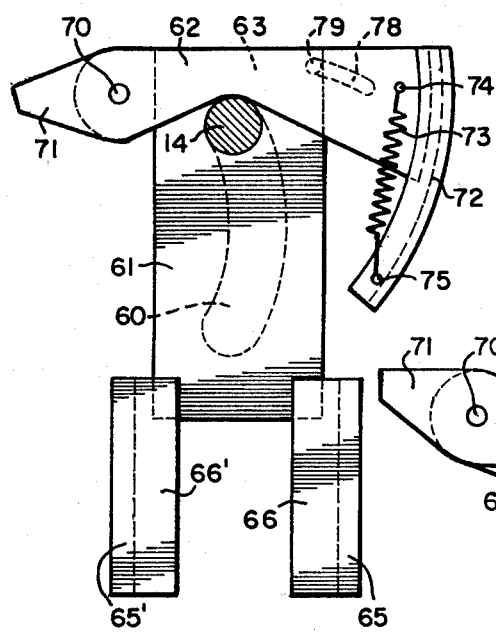
FIGS. 16, 17 and 18 are fragmentary views illustrating the operation of the shutters mounted on the left side wall of the housing.
Figure 17:
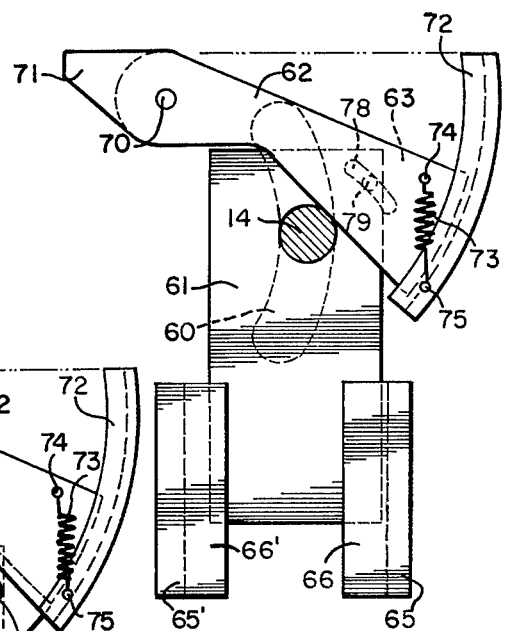
Figure 18:
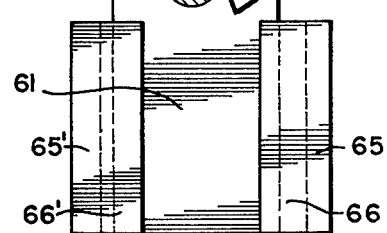

The operation of the shutters 61, 62, 63, and the coordination in their function as dust-tight closure means for closing the open portion or portions of the elongated slot 60, is illustrated in FIGS. 16–18. FIG. 16 shows the shaft 14 at its highest elevation. At that position, the slidable shutter 61 is raised vertically to close off the entire open area of slot 60, all of which is disposed below shaft 14.

In FIG. 17, shaft 14 has been lowered to an intermediate position relative to slot 60. At that position, all of the shutters 61, 62 and 63 have descended to close the open portions of the slot 60. In FIG. 17, the slidable shutter 61 closes the open portion of the slot 60 below shaft 14 as well as the open portion of the slot immediately above shaft 14. The superimposed pivotal shutters 62, 63 have descended to close the remainder of the open portion of the slot 60 above the shaft 14.

In FIG. 18, the shaft 14 has descended to its lowermost position in the slot 60. All of the open area of the slot 60 is disposed above the shaft 14, separate portions of which are closed by each of the shutters 61, 62, 63. More particularly, the lowermost portion of the open area of slot 60 is closed by slide 61, the intermediate portion is closed by pivotal shutter 63 and the upper portion is closed by pivotal shutter 62. In FIG. 18, all three of the shutters have descended to their lowermost position relative to slot 60 and side wall 24. In such position, the inner pivotal shutter 63 remains in contact with the shaft 14 but, because of the function of stop 71, the outer pivotal shutter 62 no longer is in contact with the shaft.

Thus, the invention provides a new and improved housing for a power table saw, or a similar power tool, which prevents seepage of dust through the housing. The essential character of the invention resides in the novel structure of its spaced side walls, which include relatively moveable, dust-tight elements or components operative to continuously and automatically maintain the housing in dust-tight condition regardless of the vertical or angular movement or displacement of the saw blade 13. The housing of the invention is readily adaptable to, and useable with, a power table tool such as the table saw 9 when its saw blade 13 is replaced by an accessory, such as a dado head, molding head, sanding wheel, or the like. By disconnecting the springs 46, 46' (FIG. 5) and removing table insert 11, the vertically moveable slide 40 may be readily removed to permit access to the interior chamber 28 for replacement of the saw blade 13 by either another saw blade or some other accessory cutting, sanding or grinding tool. As will be understood, the size and configuration of the slide 40 and of the stationary wall portion 41 of the right side wall 23 are selected so as to provide sufficient clearance for easy access into the housing 20 to permit ready replacement of the saw blade 13.

Although a preferred embodiment of this invention has been shown and described for the purpose of illustration, as required by Title 35 U.S.C. §112, it is to be understood that various changes and modifications may be made therein, and various uses made thereof, without departing from the spirit and utility of the invention or the scope thereof as set forth in the appended claims.

I claim:

1. In a power saw having a saw blade mounted on a rotatable shaft which is disposed below a slotted work table through which the saw blade protrudes upwardly to work sawing position, said saw blade and shaft being selectively displaceable vertically and angularly relative to the table and being connected for angular movement to a selectively tiltable support cradle, a dust confining and collection housing surrounding the portion of the saw blade below the table comprising
    (a) a hollow enclosure having spaced side and spaced end walls, said enclosure having an open top disposed in contiguous relation to the table and an open bottom connected to a source of suction,
    (b) fastening means securing the enclosure to the tiltable support cradle, whereby the housing is rendered angularly moveable in harmony with and in fixed relation to the angular movement of the saw blade and shaft,
    (c) a first side wall of the enclosure having a stationary component and a slidable component moveable up or down relative to the stationary component,
    (d) resilient means disposed on the enclosure for maintaining the slidable component of the first side wall in contiguous relation to the table when the saw blade, shaft and housing are displaced angularly relative to the table,
    (e) a second side wall of the enclosure having an opening through which the shaft for the saw blade extends, said opening being larger than the cross section of the shaft to permit the saw blade and the shaft to be displaced vertically relative to the table and the enclosure, and
    (f) shutter means disposed on the enclosure for maintaining the open portion of the opening in the second side wall closed at each location to which the saw blade and shaft are displaceable relative to the table.

2. The power saw housing of claim 1, wherein the side walls are disposed in spaced parallel relation to the saw blade.

3. The power saw housing of claim 1, wherein the end walls are disposed in spaced relation to each other transversely of the saw blade, said end walls having upper portions which are parallel to each other and lower portions which incline inwardly to a conduit connected to the source of suction.

4. The power saw housing of claim 1, wherein the first side wall of the enclosure includes
    (a) an upper portion comprising a moveable slide,
    (b) a stationary lower portion having guide tracks permitting the slide to move up or down relative to said lower portion and
    (c) spring means connecting the slide to the stationary lower portion and operable to urge the slide upwardly to maintain the slide in contiguous relation with the table.

5. The power saw housing of claim 1, wherein the second side wall of the enclosure includes
    (a) a generally vertical slot providing clearance for the saw blade shaft extending through said wall,
    (b) a slidable shutter mounted on said wall, said slidable shutter having an aperture formed therein for passage of the saw blade shaft therethrough,
    (c) guide tracks disposed on said side wall permitting the slidable shutter to move relative to said wall,
    (d) at least one pivotal shutter mounted on said wall adjacent the slidable shutter, said pivotal shutter being moveable arcuately relative to said wall, and
    (e) slot closure means disposed on said wall operative to actuate the slidable and pivotal shutters to maintain the vertical slot closed except for passage of the saw blade shaft through said slot.

6. The power saw housing of claim 5, wherein
    (a) the slidable shutter comprises a generally rectangular slide adapted to be moved up and down by the saw blade shaft relative to the slot in the second side wall and (b) the cross section of the aperture formed in the slide is of substantially the same size and shape as the cross section of the shaft to provide a close fit between the periphery of the shaft and the perimeter of the aperture, (c) said aperture perimeter constituting the slot closure means for the slide.

7. The power saw housing of claim 6 having a pivotal shutter connected to the slide, whereby movement of the slide is transmitted to the pivotal shutter to cause said shutter to move arcuately relative to the slot in the second side wall.

8. The power saw housing of claim 7, further including connection means connecting said pivotal shutter to the slide comprising (a) a pin mounted on the slide and (b) a slot formed in the pivotal shutter for reception of the pin, (c) said pin and slot constituting the slot closure means for said pivotal shutter.

9. The power saw housing of claim 5, wherein the second side wall of the enclosure includes (a) two pivotal shutters mounted on said wall adjacent the slidable shutter, both said pivotal shutters being moveable arcuately relative to said wall, and (b) slot closure means disposed on said wall operative to actuate all three shutters to maintain the vertical slot closed except for passage of the saw blade shaft through said slot.

10. The power saw housing of claim 6 having two pivotal shutters mounted on said second side wall wherein (a) a first pivotal shutter is connected to the slide, whereby movement of the slide is transmitted to said first pivotal shutter to cause said shutter to move arcuately relative to the slot in the second side wall, and (b) a second pivotal shutter is connected to resilient means affixed to the second side wall, said resilient means being operative to urge said second pivotal shutter to move arcuately relative to the slot in the second side wall.

11. The power saw housing of claim 10, wherein the resilient means connecting the second pivotal shutter to the second side wall constitutes the slot closure means for said pivotal shutter.

12. The power saw housing of claim 10, wherein (a) the two pivotal shutters have a common pivot point and have distal ends spaced from the pivot point and (b) an arcuate guide track is mounted on said second side wall to provide a confined passage for the distal ends of the two pivotal shutters.

13. The power saw housing of claim 10, wherein the second pivotal shutter is provided with stop means to limit the arcuate movement of said shutter to a selected arcuate distance relative to the slot.

14. The power saw housing of claim 10, wherein each of the pivotal shutters is provided with stop means to limit the angular movement of the pivotal shutters relative to the slot in the second side wall.

15. A power saw housing according to claims 5, 6 or 9, wherein (a) the generally vertical slot formed in the second side wall is of arcuate configuration, (b) the slidable shutter comprises a generally rectangular slide adapted to be moved both vertically and horizontally by the saw blade shaft upon movement of the saw blade and shaft relative to the table, (c) the guide tracks disposed on the second side wall are spaced apart a distance greater than the width of the slide, to provide the slide with capacity for horizontal movement relative to the arcuate slot and (d) elongated flanges formed on the guide tracks for the slide are operative to prevent disengagement of the slide from said guide tracks.

16. In a power tool having a work cutting element mounted below a work table through which the element protrudes to work cutting position, said work cutting element being selectively displaceable vertically and angularly relative to the table and being connected for angular movement to a selectively tiltable support means, a dust confining and collection housing surrounding the portion of the work cutting element below the table comprising (a) a hollow enclosure having spaced side and spaced end walls, said enclosure having an open top disposed in abutting relation to the table and an open bottom connected to a source of suction, (b) fastening means securing the enclosure to the tiltable support means, whereby the housing is rendered angularly moveable in harmony with and in fixed relation to the angular movement of the work cutting element, (c) a first side wall of the enclosure having a stationary component and a slidable component moveable up or down relative to the stationary component, (d) resilient means disposed on the enclosure for maintaining the slidable component of the first side wall in abutting relation to the table when the work cutting element and housing are displaced angularly relative to the table, (e) a second side wall of the enclosure having an opening through which a support for the work cutting element extends, said opening being elongated to permit the work cutting element to be displaced relative to the table and the enclosure, and (f) shutter means disposed on the enclosure for maintaining the elongated opening in the second side wall closed at each location to which the work cutting element is displaceable relative to the table.

17. The housing of claim 16, wherein the first side wall of the enclosure includes (a) an upper portion comprising a moveable slide, (b) a stationary lower portion having guide tracks permitting the slide to move up or down relative to said lower portion and (c) spring means connecting the slide to the stationary lower portion and operable to urge the slide upwardly to maintain the slide in abutting relation with the table.

18. The housing of claim 16, wherein the second side wall of the enclosure includes (a) a slot providing clearance for the work cutting element support extending through said wall, (b) a slidable shutter mounted on said wall, said slidable shutter having an aperture formed therein for passage of the support therethrough, (c) guide tracks disposed on said side wall permitting the slidable shutter to move relative to said wall, (d) at least one pivotal shutter mounted on said wall adjacent the slidable shutter, said pivotal shutter being moveable arcuately relative to said wall, and
(e) slot closure means disposed on said wall operative to actuate the slidable and pivotal shutters to maintain the slot closed except for passage of the work cutting element support through said slot.

19. The housing of claim 18, wherein the second side wall of the enclosure includes
   (a) two pivotal shutters mounted on said wall adjacent the slidable shutter, both said pivotal shutters being moveable arcuately relative to said wall, and
   (b) slot closure means disposed on said wall operative to actuate all three shutters to maintain the slot closed except for passage of the work cutting element support through said slot.

* * * * *